United States Patent
Choi et al.

(10) Patent No.: US 10,234,311 B2
(45) Date of Patent: Mar. 19, 2019

(54) MODIFYING OPTICAL SIGNALS OUTPUT BY A WAVELENGTH DIVISION DEMULTIPLEXER TO DETECT SUBTERRANEAN PHYSICAL PROPERTIES

(71) Applicant: HALLIBURTON ENERGY SERVICES, INC., Houston, TX (US)

(72) Inventors: Han-Sun Choi, Houston, TX (US); David A. Barfoot, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 56 days.

(21) Appl. No.: 15/510,567

(22) PCT Filed: Oct. 14, 2014

(86) PCT No.: PCT/US2014/060337
§ 371 (c)(1),
(2) Date: Mar. 10, 2017

(87) PCT Pub. No.: WO2016/060644
PCT Pub. Date: Apr. 21, 2016

(65) Prior Publication Data
US 2017/0292861 A1  Oct. 12, 2017

(51) Int. Cl.
*G01D 5/353* (2006.01)
*G01D 5/26* (2006.01)
*G01V 8/00* (2006.01)
*G01V 1/22* (2006.01)

(52) U.S. Cl.
CPC ......... *G01D 5/3537* (2013.01); *G01D 5/268* (2013.01); *G01V 1/226* (2013.01); *G01V 8/00* (2013.01)

(58) Field of Classification Search
CPC .......... G01V 8/00; G01V 1/226; G01B 11/00; G01D 5/268; G01D 5/3537
USPC .................................................... 250/227.14
See application file for complete search history.

(56) References Cited

U.S. PATENT DOCUMENTS

| | | | |
|---|---|---|---|
| 6,907,201 B1 | 6/2005 | Frankel | |
| 7,526,147 B2 * | 4/2009 | Meyer | G01D 5/35383 250/227.11 |
| 8,334,984 B2 | 12/2012 | Perez et al. | |
| 9,366,691 B2 | 6/2016 | Choi et al. | |
| 2004/0096213 A1 | 5/2004 | Perkins et al. | |
| 2006/0204164 A1 | 9/2006 | Ivtsenkov | |
| 2007/0258319 A1 | 11/2007 | Ronnekleiv et al. | |

(Continued)

OTHER PUBLICATIONS

PCT International Search Report and Written Opinion, dated Jun. 26, 2015, Appl No. PCT/US2014/060337, "Optically Sensing Subterranean Physical Properties Using Wavelength Division Multiplexing," Filed Oct. 14, 2014, 14 pgs.

(Continued)

Primary Examiner — Que Tan Le
(74) Attorney, Agent, or Firm — Gilliam IP PLLC

(57) ABSTRACT

A system for measuring subterranean physical properties, in some embodiments, comprises a source of broadband light, an input optical fiber coupled to the source of broadband light, a wavelength division demultiplexer coupled to the input optical fiber, a plurality of detectors arranged in parallel and coupled to the demultiplexer, a wavelength division multiplexer coupled to the plurality of detectors, and an output optical fiber coupled to the multiplexer.

20 Claims, 11 Drawing Sheets

(56) References Cited

U.S. PATENT DOCUMENTS

2011/0139447 A1    6/2011   Ramos et al.

OTHER PUBLICATIONS

Maximillian, Perez A., et al., "A Wavelength Multiplexed Interferometric Inertial Sensor Network for Nondestructive Evaluation and Distributed Monitoring," Proc. of SPIE, vol. 6531, 65310B, 2007, 12 pgs.
Maximillian, Perez A., et al., "Design and Demonstration of a Bulk Micromachined Fabry-PÉrot µ g-Resolution Accelerometer," IEEE Sensors Journal, vol. 7, No. 12, Dec. 2007, pp. 1653-1662.

* cited by examiner

MODIFYING OPTICAL SIGNALS OUTPUT BY A WAVELENGTH DIVISION DEMULTIPLEXER TO DETECT SUBTERRANEAN PHYSICAL PROPERTIES

BACKGROUND

Systems that sense acoustic or mechanical energy are used in a variety of applications, including, but not limited to, oilfield drilling and maintenance, underwater monitoring, and maintenance of large structures, such as mines, bridges and elevators. In these sensing systems, sensors take measurements at their respective locations. The measurements taken by the sensors are compiled and may be used to provide information regarding the structure(s) or locations that are monitored.

One class of sensor is optical in nature. An optical sensor can generate optical signals and can direct measured information to the processor via one or more optical fibers. One issue facing some optical fiber-based sensing systems is channel count—that is, the number of different streams of optical data that may be transmitted at a time. In one approach, sensors can be optically coupled to an optical excitation or detection apparatus using a one-to-one arrangement including a respective optical fiber for each sensor. However, such an approach may preclude use of more than a handful of optical sensing channels because the number of optical fibers may be limited due to cost or space constraints. Prior attempts to address this issue have resulted in sensing systems that are unacceptably insensitive to swings in acoustic or mechanical energy.

BRIEF DESCRIPTION OF THE DRAWINGS

Accordingly, there are disclosed in the drawings and in the following description various methods and systems for optically sensing subterranean physical properties using wavelength division multiplexing. In the drawings.

Figure 1:
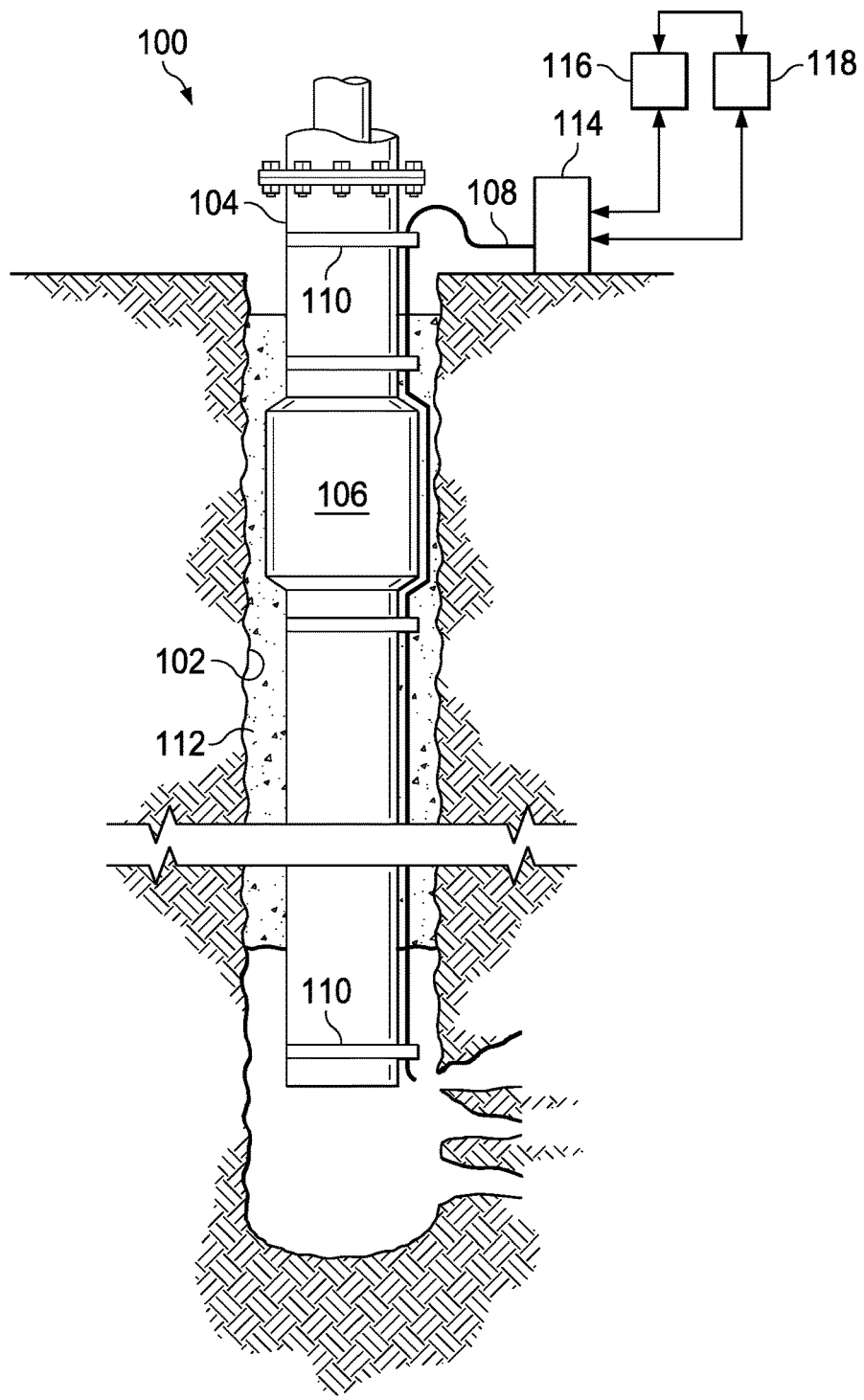
FIG. 1 is a schematic of a borehole with an optical fiber-based sensing system disposed therein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are optical fiber-based methods and systems for sensing subterranean physical properties using wavelength division multiplexing. In some embodiments, pulsed light passes through an input fiber, interacts with multiple acceleration and/or acoustic sensors disposed along the length of the fiber, returns along an output fiber, and is then processed to extract detected values of acceleration and/or acoustic vibration from a spectrum of the return light. Each sensor comprises a coarse wavelength division demultiplexer that demultiplexes incoming broadband optical signals into constituent optical signals. Each constituent optical signal is provided to one of a plurality of detectors within the sensor that produces an output optical signal based on the received constituent optical signal and a different directional component of a subterranean physical property or properties (e.g., acceleration) affecting that detector. A coarse wavelength division multiplexer within the sensor then multiplexes the output optical signals to form a signal pulse that indicates the influence of the subterranean physical property or properties on the different detectors. In some embodiments, the sensing system performs coarse wavelength division multiplexing on signal pulses to extract multiple channels of data from the return light, performs wavelength division multiplexing to detect shifts in peak wavelength within each data channel, and performs time-division multiplexing to associate particular sensed values with the corresponding sensors along the output and input fibers. The information obtained may then be used as desired.

Such optical systems offer many advantages. For example, transmission of an optical signal along a fiber is largely immune to electrical noise in the surroundings. In addition, many optical sensors operate passively, without requiring batteries or a supply of electrical power from outside the borehole. Furthermore, because the materials in an optical fiber are types of glass or have chemical compositions that are similar to that of glass, the fibers may be more resistant to corrosion than comparable metallic conductors.

A distributed fiber optic sensing system is a particularly useful tool in many operations in oil and gas wells. An illustrative use is as a seismic sensing system that may be temporarily installed in a wellbore or that may be temporarily placed in a string within an open hole or cased well. Such a seismic monitoring system will typically include a plurality of sensors distributed along the length of a borehole (or, possibly, along the earth's surface). The sensors detect one or more physical properties associated with a seismic event, such as acceleration and acoustic vibration, and they convert the sensed properties to one or more optical signals that are then communicated through an optical fiber to a central processing assembly for further processing. In some embodiments, the central processing assembly analyzes the received optical signals, such as the signal spectrum, to determine the sensed physical properties for each sensor. In the case of a seismic sensing system, once the sensed physical properties are determined, the central processing assembly may use well-known triangulation methods to pinpoint a location and/or an intensity of a particular detected seismic event.

FIG. 1 is a schematic drawing of an illustrative distributed optical sensing system 100. Sensing system 100 is disposed in a borehole 102 in association with a casing string 104.

Although system 100 is shown as being permanently installed in the borehole, alternative installation arrangements are also contemplated and fall within the scope of this disclosure. In this illustrative embodiment, a fiber optic cable assembly 108 couples to the exterior of the casing string 104 with straps 110. The assembly 108 may be protected in various locations by optional cable protectors. In some embodiments, the fiber optic cable assembly 108 is attached to a different portion of the casing string, such as the string's interior. The assembly 108 may also be attached by another suitable element other than straps, and it may include further protection elements. In applications wherein the fiber optic cable assembly 108 is disposed within the casing of a well or within tubing in that casing, the assembly may include anchors or other devices known to the art to couple the assembly, and particularly the sensors thereof, to the adjacent surfaces.

The fiber optic cable assembly 108 includes multiple sensors 106 attached to the cable along the length of the cable. The casing string 104 is secured within the borehole by a cement slurry 112 which, when cured, mechanically couples the sensors to the surrounding earth so that the sensors can detect seismic activity originating outside the borehole 102. The fiber optic cable 108 couples to an interrogation module 114, which is typically at the surface. The interrogation module 114 is used to determine sensed physical properties based on signals received from downhole sensors 106. Although acceleration and acoustic vibrations are the physical properties discussed in the following sections, other suitable physical properties that may be sensed by a fiber-based sensing system can include pressure, strain, deformation, and velocity. The interrogation module 114 couples to a light source 116, which supplies light to the fiber or fibers in fiber optic cable assembly 108. A processing assembly 118 couples to and controls both the interrogation module 114 and the light source 116.

Processing assembly 118 (which comprises any suitable processing logic, such as—without limitation—a computer, laptop, or tablet) controls system operation, provides a suitable user interface, and provides for the receiving, storage, and retrieval of data from the system. In some embodiments, processing assembly 118 includes one or more processors in combination with additional hardware as needed (volatile and/or non-volatile memory; communication ports; I/O device(s) and ports, etc.) to provide the illustrative functionalities described herein and any additional functionalities that will be apparent to those skilled in the art. An illustrative processing assembly 118 may control functions of the system (including the transmission of light pulses through the fiber optic cable 108 to the sensors) and may receive and process measurements from the sensors as needed to determine the sensed formation properties and other related information in essentially real time. In some embodiments, one or more non-volatile, machine-readable storage devices (e.g., a memory device (such as DRAM, FLASH, SRAM, or any other known form), a hard drive, or other mechanical, electronic, magnetic, or optical storage mechanism, etc.) contain instructions suitable to cause the processor to perform the desired functionality, such as the various embodiments discussed herein. Some of these functions may be implemented by separate components within processing assembly 118 (which components may themselves be or include processing assemblies), as desired. Additional functions may be performed by such one or more processing assemblies in response to similarly stored instructions.

The following sections discuss various aspects of the sensing system. The "LIGHT SOURCE" section describes a light source that produces high-powered, broadband pulses that are suitable for use in the sensing system. The "SENSOR" section describes a sensor capable of receiving the pulses and imparting one or more particular optical effects on the pulses that indicate one or more sensed physical properties from the sensor. Typically, the sensor includes three detectors (e.g., accelerometers) arranged along orthogonal directions, in order to sense a full three-dimensional vector value of acceleration. The "SENSOR" section describes suitable accelerometers as well. The "SENSING SYSTEM OVERVIEW" section describes a generic system topology. Four "EXAMPLE" sections describe four illustrative system topologies. The "EXAMPLE METHODS OF OPERATION" section discusses methods of operation for the light source and for the sensing system.

Light Source

While many light source configurations may be used in the systems described herein, in some embodiments, the light source 116 is a pulsed, broadband source. Because sensors (as discussed below) may significantly attenuate the light that passes through them, the light source 116 should have a relatively high power. For example, a power in the range of a few hundred milliwatts (mW) peak will be satisfactory for many applications, though sources operating outside this range may be suitable for some system configurations. For purposes of the present disclosure, the term "high power" as to a light source output refers to a power at or exceeding 100 (mW) peak as measured at the light source output to a fiber optic or other transmission mechanism.

The pulsed source enables use of time-division multiplexing (TDM) for communication with the sensors along a single fiber or along a relatively few number of fibers (compared with the number of sensors). Light source 116 preferably provides light across a spectrum that is sufficiently broad to facilitate a desired number of channels and to facilitate obtaining individualized signals from each sensor in the system configuration of interest. Thus, the spectral width of light source 116 will, in some embodiments, span all of the various channels used by the sensors. For purposes of the present specification, a broadband source produces broadband optical signals with wavelengths spanning a range of at least about 80 nm, though the wavelengths need not be continuous across the entirety of such range.

For example, in the illustrative embodiments below, the sensors operate in a wavelength range of 1530 nm to 1610 nm, which occupies all of the telecommunications C-band (1530 nm to 1565 nm) and a portion of the telecommunications L-band (1565 nm to 1625 nm). These wavelength ranges are desirable due to their low loss levels in many single-mode and multi-mode optical fibers, although other suitable wavelengths may be used as well. Those skilled in the art will recognize that the definitions of C-band and L-band used herein are those that are conventionally used for optical fiber-based telecommunications systems and are not the same C-band and L-band that are used for over-the-air communication systems or microwave systems. Typical off-the-shelf components from the field of telecommunications are usually designed for the C-band or for the L-band, but not for both simultaneously. For example, typical pulse modulators are available in either the C-band or the L-band, but these typical pulse modulators do not work in both bands simultaneously.

Figure 2:
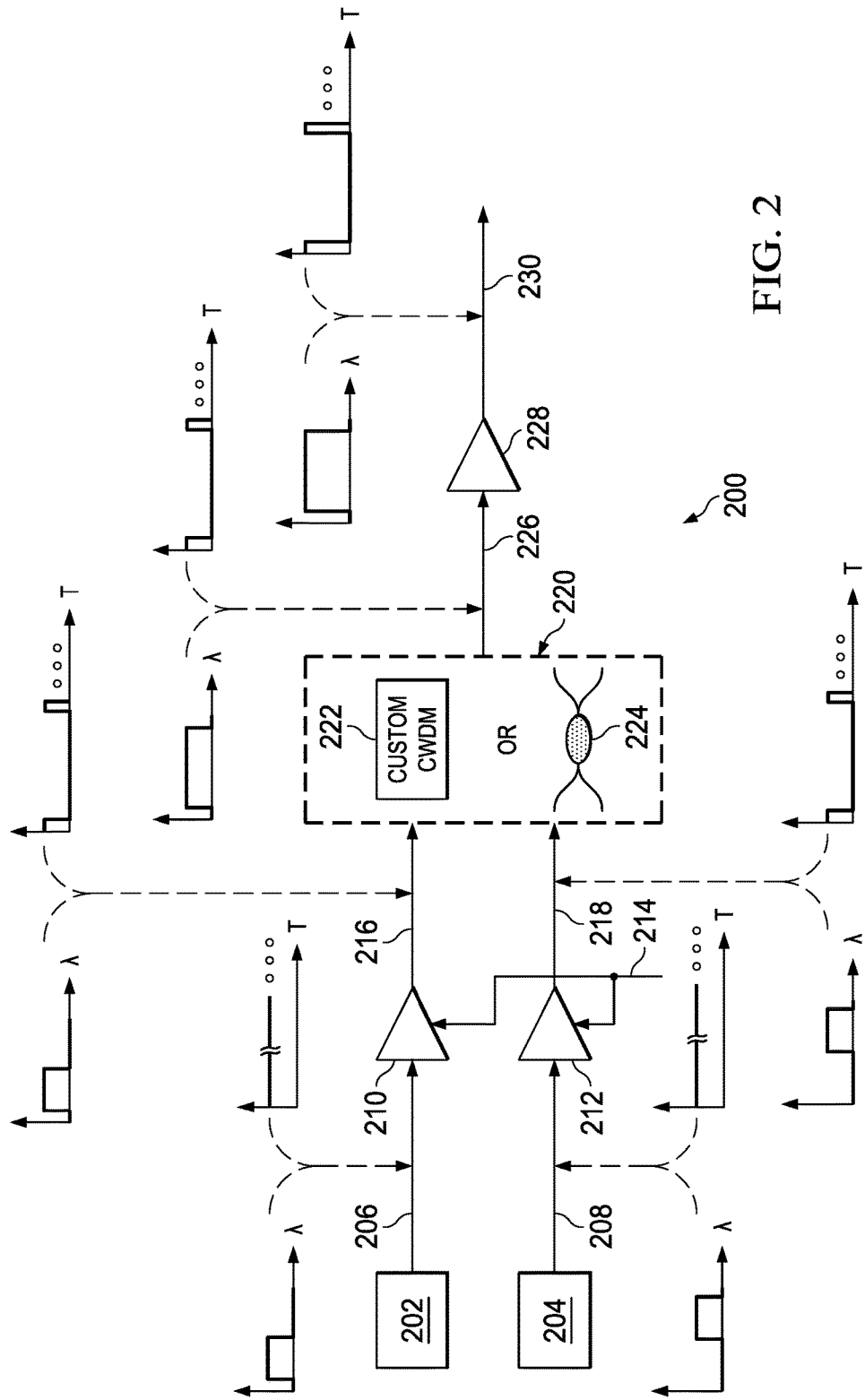
FIG. 2 is a schematic of a high-power, broadband, pulsed light source.

FIG. 2 is a schematic of an illustrative light source 200 that may be implemented as light source 116 in accordance with embodiments. Two separate light producing elements each produce low-power, non-pulsed light beams in different wavelength ranges, such as the C-band and the L-band. The two low-power non-pulsed beams are each pulsed separately, with the pulses being triggered by a common trigger, so that they form synchronized low-power pulses. The synchronized low-power pulses are combined to form broadband low-power pulses. The broadband low-power pulses are then amplified to form broadband high-power pulses, which are suitable for use in the sensing system. In other examples, more than two light-producing elements may be used.

The light source 200 includes a first light producing element 202, which produces non-pulsed (e.g., continuous-wave) light 206 in a first wavelength band. A suitable first wavelength band may be the telecommunications C-band, which spans the wavelength range of 1530 nm to 1565 nm. A suitable spectral bandwidth for the first light producing element may be 40 nm. Other suitable wavelength ranges and bandwidths may also be used. The light source 200 includes a second light producing element 204, which produces non-pulsed light 208 in a second wavelength band, which is different from the first wavelength band. A suitable second wavelength band may be the telecommunications L-band, which spans the wavelength range of 1565 nm to 1610 nm. A suitable spectral bandwidth for the second light producing element may be 40 nm. Other suitable wavelength ranges and bandwidths may also be used, and more than two light producing elements may also be used.

An illustrative light-producing element (e.g., an emitter) that is well-suited for use in the light source 200 is an Amplified Spontaneous Emission (ASE) light source, which is typically formed from a piece of Erbium doped fiber pumped by a high power 980 nm or 1480 nm laser. Another example light-producing element that is well-suited for use in the light source 200 is a Super-luminescent Diode (SLD). In some embodiments, both light producing elements 202, 204 are ASE sources. In other embodiments, both light producing elements 202, 204 are SLD sources. In still other embodiments, the two light producing elements 202, 204 include both an ASE and an SLD. Other suitable emitters may be used as well.

The non-pulsed light 206, 208 at the first and second wavelength bands is directed to respective first and second amplifiers 210, 212. The amplifiers 210, 212 are triggered by a common trigger signal 214, which is typically a periodic electrical signal that oscillates between a low voltage and a high voltage. The trigger signal may be generated by an interrogation module, a demodulator, an external device, or any other suitable device capable of delivering a periodic electrical signal with a desired frequency. For each cycle of oscillation, the amplifiers 210, 212 form one pulse in their respective output signals. Because the amplifiers 210, 212 trigger from a common trigger signal 214, the light from the light producing elements 202, 204 is pulsed simultaneously, and the pulses produced by the amplifiers 210, 212 are synchronized. The outputs from the first and second amplifiers 210, 212 are pulsed light 216 in the first wavelength band, and pulsed light 218 in the second wavelength band, respectively. An example amplifier that is well suited for use in the light source 200 is a Semiconductor Optical Amplifier (SOA).

A beam combiner 220 sums the pulsed light 216 in the first wavelength band and the pulsed light 218 in the second wavelength band to form broadband pulsed light 226. The broadband pulsed light 226 has a spectral width that spans both the first and second wavelength bands. In some cases, the broadband pulsed light 226 can have a wavelength spectrum that spans both the telecommunications C- and L-bands.

An illustrative beam combiner that is well-suited for use in the light source is a custom coarse wavelength division multiplexer (CWDM) 222. The custom CWDM 222 uses one or more wavelength-sensitive elements to efficiently combine the light in the first and second wavelength bands. For instance, the CWDM 222 typically uses a wavelength-sensitive coating that reflects one wavelength band but transmits the other wavelength band. Such a coating may be used to superimpose the light in one wavelength band onto the light from the other wavelength band. In general, such wavelength-sensitive elements are relatively efficient in combining light in two different wavelength ranges. Another illustrative beam combiner that is well-suited for use in the light source is a 2-by-1 coupler 224. Such a coupler 224 is typically less expensive than a CWDM 222 but is not as efficient. A 2-by-1 coupler 224 typically does not rely on wavelength-sensitive elements to perform the beam combination and, as a result, has an output that is typically somewhat lower than the CWDM 222. The CWDM 222 and the coupler 224 are merely two examples; other suitable beam combiners may be used as well.

In some embodiments, the amplifiers 210, 212 impart different gains to the two wavelength bands so that the resultant summed pulses may have a desired wavelength spectrum. For instance, the amplifiers 210, 212 may statically or dynamically adjust their gains so that the output wavelength spectrum of the summed pulses is generally flat, or so that a desired spectrum is achieved. In some embodiments, the amplifiers 210, 212 dynamically adjust their gains in response to feedback from one or more elements downstream in order to produce a desired output wavelength spectrum. For instance, the relative intensities of the four output channels, obtained downstream, may be used to drive the dynamic adjustment of the amplifier gains.

The broadband pulsed light 226 is amplified by an amplifier 228 to form amplified broadband pulsed light 230. The amplifier 228 does not significantly affect the spectrum of the amplified light, and does not significantly affect the pulse duration or timing. An illustrative amplifier that is well-suited to produce the output light in the light source 200 is an Erbium Doped Fiber Amplifier (EDFA). Other suitable amplifiers may also be used.

After amplification, the amplified broadband pulsed light 230 is directed out of the light source 200 through an output fiber or other optical coupling to deliver the pulsed light 230 to other portions of a system. The amplified broadband pulsed light 230 produced in this manner may have a peak power of up to one thousand mW or more (>30 dBm), which should be suitable for powering an illustrative sensing system having, as just one example, up to 40 TDM levels to provide a total of 160 channels.

Generally, such pulses cannot be produced by the use of a single off-the-shelf light source developed for the telecommunications industry. Using the techniques discussed herein, however, multiple off-the-shelf sources can be used together to provide the appropriate extended wavelength spectrum. Although two light producing elements 202, 204 and two amplifiers 210, 212 are used in the example of FIG. 2, more than two of each may be used to extend the wavelength spectrum of the light source 200 as needed. For example, the light source may include three, or more than six light producing elements and amplifiers.

Additionally, for particular examples that may implement a narrower spectrum, such as a system that uses fewer than four channels, or a system in which the dynamic range is reduced so that the data channels have a reduced width, the light source may include only a single light producing element.

Sensor

Figure 3:
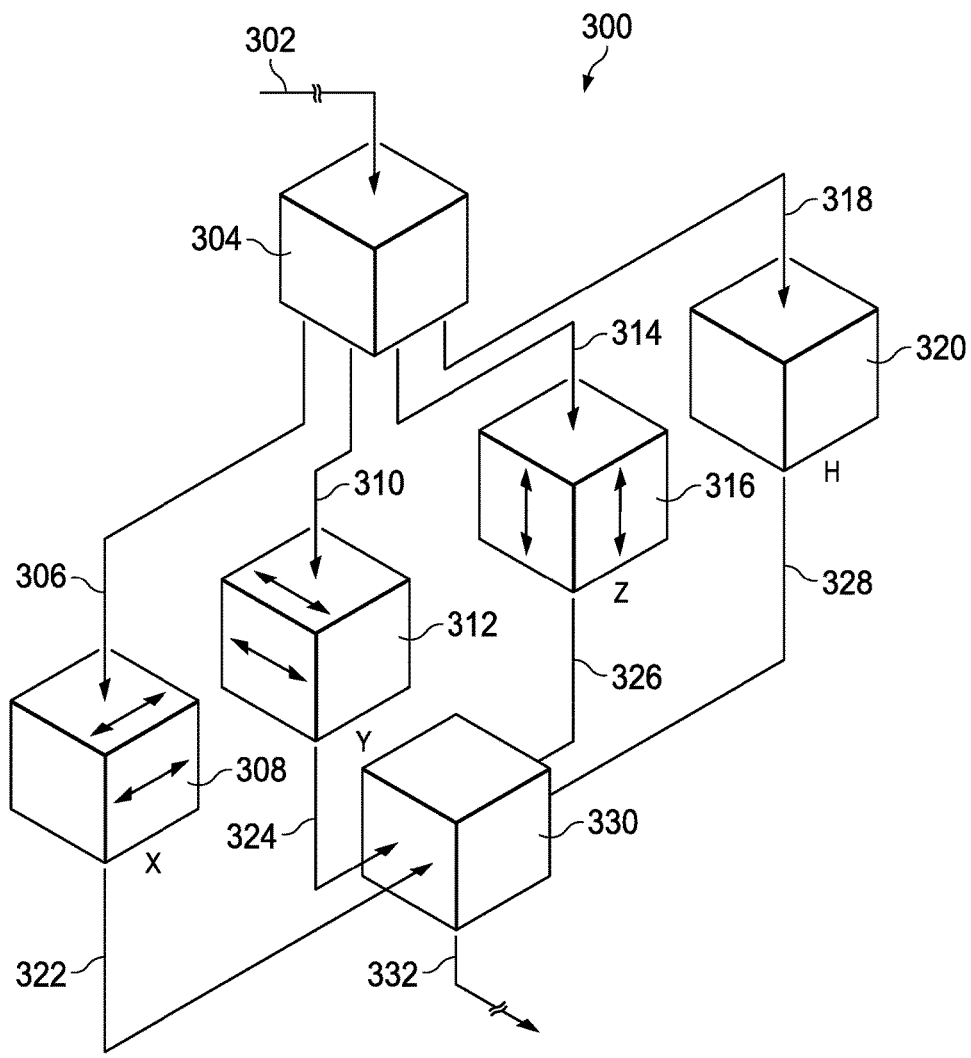
FIG. 3 is a perspective schematic of the optical path in an illustrative sensor.

FIG. 3 is a perspective schematic drawing of a single sensor 300 of the type that may be coupled to an optical fiber along its length in the sensing system. Light enters the sensor 300 through input optical fiber 302 and exits through output optical fiber 332. It is assumed that the optical elements between fibers 302 and 332 are packaged in a known manner within a sealed housing (not specifically shown) so that the sensor may be resistant to a harsh environment. In general, a rigid, sealed housing is preferable for sensors that detect only acceleration or acoustic vibrations mechanically coupled to a respective transducer, since physical exposure of the transducer to the environment or medium surrounding the sensor is not needed (e.g., in contrast to a pressure sensing application, wherein a portion of the transducer may be coupled to or surrounded by a propagation medium such as a gas or liquid). The housing may be formed as a cylinder, and it may be made from a metal that is suitably resistant to corrosion. Other suitable housings may also be used. Housings, however, are not required.

The sensor 300 comprises a demultiplexer 304, which couples to the input optical fiber 302; optical fibers 306, 310, 314, 318, 322, 324, 326 and 328; physical property detectors 308, 312, 316 and 320 arranged in parallel with each other; and multiplexer 330, which couples to output optical fiber 332. The demultiplexer 304 comprises a wavelength division demultiplexer (e.g., a coarse wavelength division demultiplexer). Similarly, the multiplexer 330 comprises a wavelength division multiplexer (e.g., a coarse wavelength division multiplexer). In some embodiments, the physical property detectors 308, 312, and 316 comprise accelerometers. They are arranged to be sensitive to acceleration along mutually orthogonal directions. The detector 320 measures acoustic vibrations and may be designed in a known manner to be largely or wholly direction-insensitive. The acoustic vibrations-dedicated detector (e.g., a hydrophone) functions in a manner similar to that of the other three detectors but without directional sensitivity.

The three orthogonally-oriented detectors 308, 312 and 316 can provide X-, Y-, and Z-component values of acceleration, which together form a full acceleration vector having a direction and a magnitude. FIG. 3 schematically shows the X, Y, and Z directions with the arrows shown within detectors 308, 312, and 316, respectively. It will be readily understood that X, Y, and Z, as used herein, are intended only to signify three arbitrary, mutually orthogonal directions and, as such, are relative directions, not absolute directions. In practice, a sensor can be calibrated with its surroundings to convert the values obtained from its three mutually-orthogonal accelerometers into any suitable coordinate system. The acoustic vibrations-dedicated detector 320 is abbreviated herein as H.

The four detectors produce signals in four corresponding channels, with the channels being denoted by the shorthand of (X, Y, Z, H). Although the illustrative sensor package 300 uses four detectors and produces data in four corresponding channels, it will be understood that any suitable number of accelerometers and corresponding channels may be used, from one to four, or to eight or more.

The four channels (X, Y, Z, H) may be respectively assigned to occupy four adjacent bands of wavelengths, where each band has an upper wavelength and a lower wavelength that remain invariant over the life of the sensor 300. In the embodiments discussed herein, each wavelength band has a width of 20 nm, and the full four-channel output has a total width of 80 nm. It will be understood that the use of four channels having a spectral width of 20 nm is an example, and that other suitable numbers of channels and channel spectral widths may also be used.

As discussed below, the signal produced by each detector is in the form of a relatively narrow band of wavelengths transmitted within the particular 20 nm-wide channel. As the detector moves in response to a sensed acceleration, the peak wavelength of the relatively narrow transmitted band shifts within the 20 nm-wide band. Such shifting may be on the order of up to +/−5 nm to +/−7 nm at its maximum, away from a center of the 20 nm-wide band. The maximum shifting of the peak wavelength is intended to be less than a half-width of the data channel, or less than 10 nm for the example of a 20 nm-wide data channel. The resolution of such a wavelength shift may be significantly smaller than the maximum displacement of 5 nm or 7 nm, with wavelength sensitivities typically on the order of than 0.1 nm or less.

In the illustrative optical path shown in FIG. 3, light—that is, an optical signal—enters the sensor 300 along fiber 302. The entering optical signal is broadband and has a wavelength spectrum that extends across all four data channels X, Y, Z, and H. The broadband optical signal first enters the demultiplexer 304. The demultiplexer 304 preferably performs coarse wavelength division demultiplexing on the broadband optical signal, although all suitable demultiplexing techniques fall within the scope of this disclosure. Having demultiplexed the broadband optical signal, the demultiplexer 304 outputs multiple constituent signals. The number of constituent signals is preferably the same as the number of detectors present in the sensor 300. In the illustrative embodiment of FIG. 3, the sensor 300 includes four detectors 308, 312, 316 and 320 corresponding to channels X, Y, Z and H, respectively. Thus, the demultiplexer 304 outputs four constituent signals. As explained above, each constituent signal corresponds to a relatively narrow wavelength band. Thus, for instance, the broadband optical signal may have an 80 nm wavelength band spanning 1530 nm to 1610 nm, and each of the four constituent signals may have a wavelength band spanning different 20 nm portions of that 80 nm band. In this instance, a first constituent signal may have a band ranging from 1530 nm to 1550 nm; the second constituent signal may have a band ranging from 1550 nm to 1570 nm; the third constituent signal may have a band ranging from 1570 nm to 1590 nm; and the fourth constituent signal may have a band ranging from 1590 nm to 1610 nm. Other band allocations are contemplated.

Continuing with FIG. 3, each of the constituent signals is provided to a different detector via optical fibers. A first constituent signal corresponding to the X channel is provided to the detector 308 via optical fiber 306. A second constituent signal corresponding to the Y channel is provided to the detector 312 via optical fiber 310. A third constituent signal corresponding to the Z channel is provided to the detector 316 via optical fiber 314. A fourth constituent signal corresponding to the H channel is provided to the detector 320 via optical fiber 318.

As constituent optical signals pass through the detectors within the sensor 300, each detector produces an output optical signal measuring one of the physical properties affecting that detector by varying a characteristic of the optical signal. In the illustrative sensor 300, the physical properties that may be measured include acceleration and acoustic vibrations. Other examples include pressure, strain, deformation, and velocity. In the sensor 300, the output optical signal produced by each detector is in the form of a single transmitted wavelength (or a relatively narrow band of transmitted wavelengths) within a range of wavelengths allocated for the data channel corresponding to that detector. Thus, for instance, a constituent optical signal may enter detector 308 with a wavelength band of 20 nm (e.g., ranging from 1530 nm to 1550 nm), but the output optical signal produced by that detector 308 may be only a single wavelength (e.g., 1541 nm) or a narrow range of wavelengths (e.g., 1543-1544 nm) within that 20 nm band. The wavelength(s) associated with the output optical signal produced by a detector is determined by the physical properties (e.g., acceleration, acoustic vibrations) affecting that detector and may vary with time. Preferably, however, the wavelength(s) of an output optical signal is always within the 20 nm band corresponding to the detector that produces that output optical signal. In the illustrative sensor 300, the characteristic of the output optical signals that varies according to the physical properties affecting the detectors is a peak wavelength. Varying other characteristics of output optical signals according to physical properties, however, falls within the scope of the disclosure.

Accordingly, a constituent optical signal is provided from the demultiplexer 304 to the detector 308 via the optical fiber 306. The detector 308 comprises an accelerometer that is sensitive to a component of acceleration along the X-direction. The output optical signal produced by the detector 308 is in the X channel and appears as a single transmitted wavelength (or a relatively narrow band of wavelengths) within the 20 nm-wide band of wavelengths designated for the X channel. As the detector 308 experiences acceleration having a component along the X-direction, the peak transmitted wavelength shifts within the X channel. The detectors 312 and 316 operate similarly. When a constituent optical signal passes through the detector 320, the detector 320 records an acoustic signal, but it generally lacks the directional sensitivity of the X, Y and Z detectors.

Upon exiting the four detectors 308, 312, 316 and 320, the output optical signals are provided to a multiplexer 330, which, in preferred embodiments, is a coarse wavelength division multiplexer (although embodiments are not limited to any particular type of multiplexer). The multiplexer 330 performs the operation of the demultiplexer 304 in reverse—that is, it multiplexes the four output optical signals to produce a signal pulse, which is then provided to optical fiber 332 for transmission out of the sensor 300 and to other parts of the sensing system.

Figure 4:
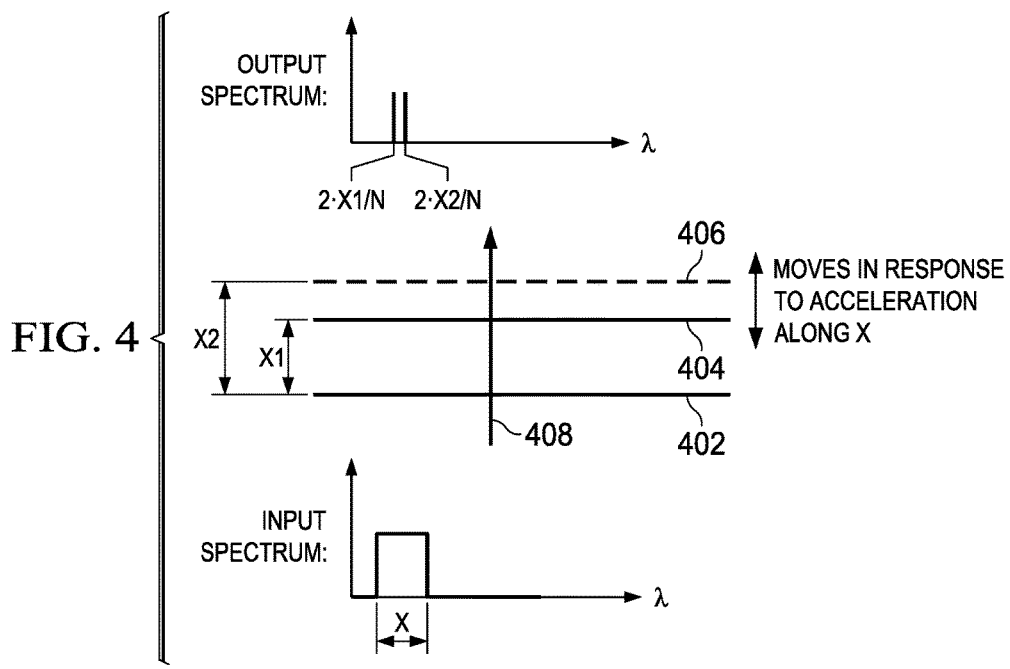
FIG. 4 is a schematic of a Fabry-Perot cavity suitable for use in a detector in the sensor.

FIG. 4 is a schematic representation of an illustrative Fabry-Perot cavity 400 that may be used in each of the detectors in the sensor package 300. Note that in an actual detector, these cavities will be oriented suitably to have sensitivities along the desired X, Y and Z directions. In the diagram of FIG. 4, an optical signal 408 passes upward through the cavity, along the X direction (X being arbitrary). The cavity is responsive to acceleration having a component along this vertical X-direction. Note that cavity 400 of FIG. 4 is shown for the X-direction; cavities that are sensitive to the Y- and Z-directions are similar in structure, but are oriented suitably to be sensitive to accelerations in the Y- and Z-directions.

The Fabry-Perot cavity is formed between a broadband reflector 402 and a parallel broadband reflector, shown as a solid line 404 when the accelerometer senses a first acceleration value and shown as a dashed line 406 when the accelerometer senses a second acceleration value different from the first acceleration value. The separation between the surfaces is shown as being X1 and X2 for the first and second acceleration values, respectively.

Fabry-Perot cavities have a relatively high transmission when the optical path within the cavity is an integral number of wavelengths, and a relatively low transmission otherwise. As the cavity spacing varies during operation, the wavelength that satisfies the integral-number criterion also varies, and the peak wavelength of the transmitted light shifts within the particular data channel. The transmitted wavelengths are shown in FIG. 4 as being $2 \cdot X1/N$ and $2 \cdot X2/N$ for the first and second acceleration values, respectively, where N is an integer. The cavity spacing, and therefore the value of N, is selected so that during operation, only one wavelength within the particular data channel is transmitted. It is assumed that the refractive index inside the cavity is unity; the relationship between transmitted wavelength and cavity separation may be modified to include a non-unity refractive index, if desired. The surfaces within the cavity 400 comprise broadband wavelength reflectors, meaning that the surfaces handle light in the same way regardless of the wavelength of that light.

In practice, the transmitted wavelength is actually a narrow range of wavelengths having a peak wavelength value and having a narrow, but non-zero, width. As discussed below, the quantity of interest for the transmitted wavelength is the peak wavelength value, where the narrow, but non-zero, width is preferably kept as small as is practical. It is relatively straightforward to correlate a particular motion of a wavelength peak to a physical motion between the reflectors in a cavity and also to a value of acceleration that produces the physical motion. The equations of motion to perform this correlation are known to those of skill in the art.

Figure 5:
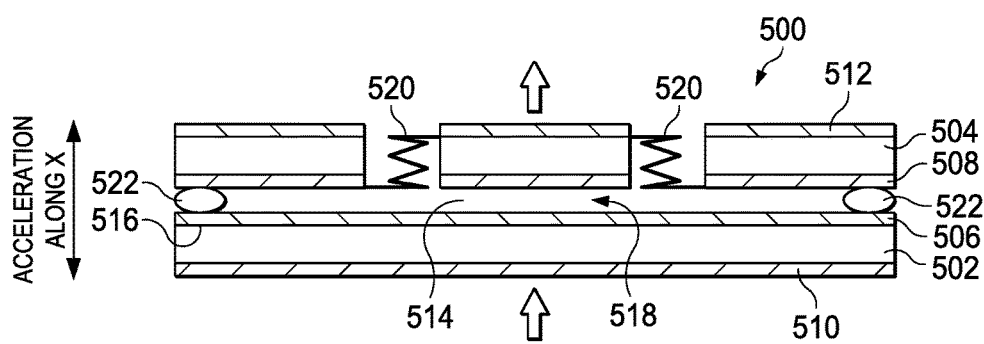
FIG. 5 is a schematic of a structure suitable for use as a detector in the sensor.

FIG. 5 shows an illustrative micro opto-mechanical system (MOMS) 500 that may be used to form the Fabry-Perot cavity in each of the four detectors in the sensor 300. The cavity 514 is formed between parallel and separated reflectors 516, each of which comprises a thin film, broadband wavelength reflector. This reflector has reflective properties that do not vary for light across the broadband wavelength spectrum of interest—in the example described above, from 1530 nm to 1610 nm. One of the reflectors 516 is formed as a thin film structure 506 on a cavity-facing surface of a transparent reference plate 502. The other reflector 516 is formed as a thin film structure 508 on a cavity-facing surface of a transparent frame 504. The reference plate 502 and the frame 504 also have respective surfaces facing away from the cavity 514, which both include respective anti-reflection coatings 510, 512. The anti-reflection coatings 510, 512 operate over the entire range of wavelengths used during operation of the sensing system.

The frame 504 has a movable portion 518 that is mechanically coupled to move with respect to the frame 504 by one or more flexures 520. The frame 504 and the reference plate 502 are aligned with respect to each other. In the example of FIG. 5, the frame 504 and the reference plate 502 are spaced apart by beads 522. The flexures 520 allow the spacing between the reflectors 516 to vary in the presence of an acceleration component perpendicular to the reflector surfaces (vertical in FIG. 5, and labeled as the X direction). The flexures 520 also ensure that the reflectors 516 remain parallel to each other during any acceleration-induced motion. The mechanical structure shown in FIG. 5 is an example, and other structures may be used instead. For example, the transparent elements that support the reflectors may be directly coupled to each other by springs, flexures, or other suitably deformable elements.

In some embodiments, the broadband wavelength spectrum reflectors used in the detectors of sensor 300 have reflectivities that fall within a range of 80% to 86%, and most preferably at approximately 86%, but possibly as low as 70%. Note that reflectivity values should not equal exactly 100%; a 100% reflectivity is undesirable because no light would pass through the reflector. In general, as the reflectivity value is increased toward 100%, the finesse of the Fabry-Perot cavity increases, the spectral width of the transmitted wavelength decreases (desirably), but the amount of light transmitting through the cavity decreases, which reduces the amount of light returned from the detector. In practice, reflectivity values in the preferred range of 80% to 86% may provide a good compromise between spectral width and total amount of returned light.

Sensing System Overview

The broadband, high-power, pulsed light source discussed earlier, along with a plurality of sensors of the type discussed earlier, are well-suited for use in a sensing system. An example of such a sensing system 600 is shown schematically in FIG. 6. In the example system 600 of FIG. 6, light is produced by a light source 602, which can be of the type discussed earlier, or can be another suitable light source. The output of the light source 602 is shown as being broadband in the wavelength (λ) plot 606, and being pulsed in the time-domain (T) plot 608. Plots 606, 608 are included only for convenience.

As discussed previously, light source 602 is typically included within a processing assembly. The light source 602 directs pulses onto an input optical fiber 610 (or alternatively into multiple fibers, as discussed earlier herein), which extends away from the measurement unit and into the environment to be measured, such as down a borehole. The input fiber(s) 610 may each be a conventional multi-mode or single-mode fiber. Light returns from the borehole along an output optical fiber 626, which extends proximate the input optical fiber 610 along its length, and is typically bundled with the input optical fiber 610 in the same single fiber optic cable. Again, not all sensors are necessarily coupled to the same output fiber 626. In most cases, the input 610 and output fibers 626 are distinct, although in some cases, they may be the same fiber.

The input fiber 610 is connected to a series of tap couplers that provide respective tap ratios (tapering up from sensor group 1 616 to sensor group N 620), to balance pulse powers delivered to each sensor group 1 through N. A time delay between respective sensor groups is selected to be slightly longer than a pulse width so as to avoid any temporal overlap of returned pulses (e.g., as shown in time domain plot 630). For example, the return fiber 626 carries a pulse train of N return pulses, each of which includes 3 (e.g., X/Y/Z) or 4 (e.g., X/Y/Z/H) CWDM wavelength peaks that respectively deliver information corresponding to 3 or 4 different physical properties.

For example, each sensor 616, 618, 620 dynamically senses a plurality of physical properties, where the physical properties are in a one-to-one correspondence with the wavelength bands corresponding to the data channels. Each sensor 616, 618, 620 forms signal pulses from the received broadband pulses by transmitting only a single wavelength within each wavelength band, and each wavelength band has a dynamically-varying peak wavelength value indicative of the corresponding sensed physical property. Each sensor directs the signal pulses along the output optical fiber 626 (or along a corresponding output fiber).

Figure 6:
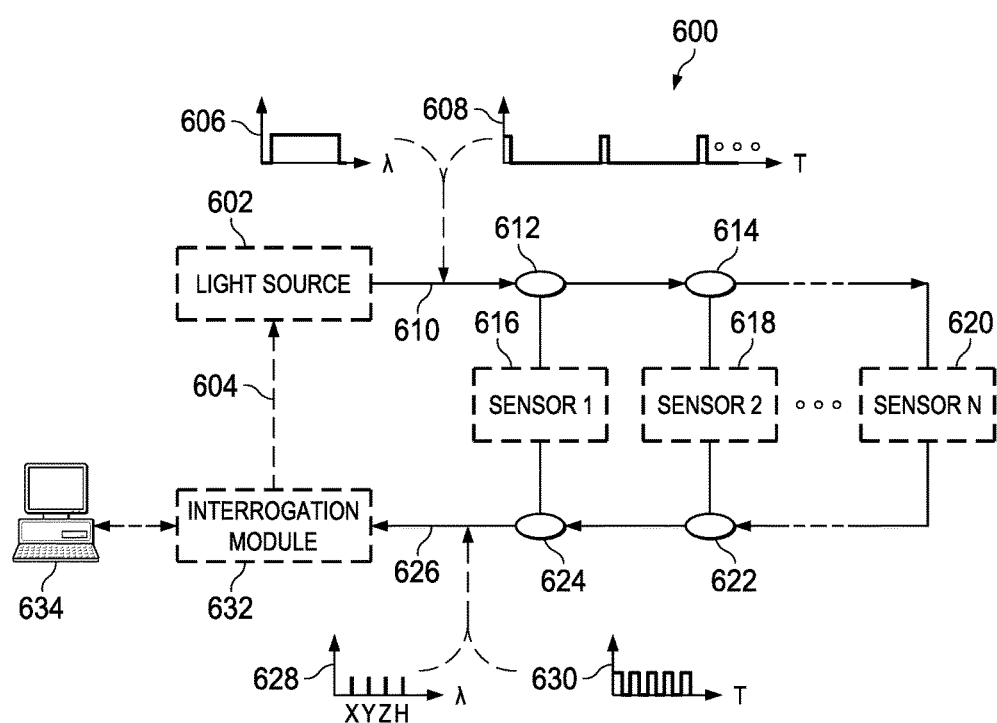
FIG. 6 is a schematic of a sensing system comprising a high-power, broadband, pulsed light source and sensors.

In the case of an N-level (i.e., N leg) system, such as that shown FIG. 6, tap ratios for each respective pair of couplers (e.g., couplers 612 and 624 are a pair, and so on) should be tapered up, starting with a ratio of 1/N (e.g., for couplers 612 and 624) then 1/(N−1) (e.g., for couplers 614 and 622), 1/(N−2), . . . , ⅓, and ½, to balance the returned pulse train (neglecting the coupler excess loss and fiber loss, which may also be taken into account to select or adjust respective tap ratios to maintain balance). The returned pulse height equals $1/(N^2)$ times of input pulse height P0.

For example, in the case of N=10:
No. 1 coupler pair has 1/10 cross-coupling and 9/10 pass-through coupling ratio
No. 2 coupler pair has 1/9 cross-coupling and 8/9 pass-through coupling ratio
No. 3 coupler pair has 1/8 cross-coupling and 7/8 pass-through coupling ratio
No. 9 coupler pair has ½ cross-coupling and ½ pass-through coupling ratio The light in the output fiber 626 is shown as including four wavelength peaks in wavelength (λ) plot 628. The peaks are indicative of signals within the X, Y, Z, and H data channels, as described above. The light in the output fiber 626 is also shown as being pulsed in the time-domain (T) plot 630.

An interrogation module 632 is coupled to the output fiber 626 and again is a part of processing assembly 634. The interrogation module 632 can include a demultiplexer coupled to the output fiber 626 for separating the output optical signals from different ones of the detectors. The term "module" is used herein to assist in clarity of the discussion of the interrogation functions and is not intended to suggest any physical structure or other form of discrete device or functionality. The interrogation module's functions can be implemented in any of a variety of ways through a processing assembly or by one or more dedicated devices capable of performing the needed functions. In some examples, the demultiplexer uses CWDM to separate the channels from one another. The interrogation module 632 can also include a converter for converting the output optical signals to electrical output signals and transmitting the electrical output signals to the processing assembly 634. Additionally, the interrogation module 632 can provide a periodic trigger signal 604 for the light source 602.

The converter can include an interferometer, which can convert a dynamically varying value of peak wavelength into a dynamically-varying value of phase. In some examples, the converter converts the phase value to an intensity value that is representative of the sensed physical property, such as acceleration or acoustic vibrations. In other examples, the converter uses a time-of arrival to sense the phase. For instance, the converter may detect the particular time of a zero-crossing (such as for a periodic electrical signal), may compare the zero-crossing time to a reference time, and may use the difference between the zero-crossing time and the reference time to determine the value of the sensed physical property, such as acceleration or acoustic vibrations.

In some examples, the sensors are addressed sequentially. For example, a first pulse from the light source 602 is directed to a first sensor 616, and the information from the first sensor 616 is recorded by processing assembly 634. The next pulse from the light source 602 may be directed to a second sensor 618, and the information from the second sensor may be recorded by processing assembly 634. Once the final sensor 620 along the input 610 and output 626 fibers has been addressed, the sensor order may be repeated as often as needed.

Generally, the pulse repetition rate has an upper limit dictated by the round-trip time of a pulse to and from the furthest sensor along input fiber 610 and output fiber 626. The repetition rate may be high enough so that a single sensor is addressed hundreds or thousands of times each second. In general, there may be more than three sensors along the input 610 and output 626 fibers. In FIG. 6, the number of sensors is denoted by the integer value of N.

The periodic trigger signal 604 is typically a two-level electrical signal, with a low-level voltage and a high-level voltage. Transitions between the low-level voltage and the high-level voltage may be used to trigger the beginning and end of the light pulses from the light source. For instance, a transition from low-to-high voltages in the trigger signal 604 may be used to mark the beginning of a pulse, and a transition from high-to-low voltages in the trigger signal 604 may be used to mark the end of a pulse. As an alternate example, a transition from high-to-low voltages in the trigger signal 604 may be used to mark the beginning of a pulse, and a transition from low-to-high voltages in the trigger signal 604 may be used to mark the end of a pulse. In this manner, the light pulses from the light source 602 may be synchronized to the interrogation module 632, and may have a particular desired duty cycle (e.g., a proportion of a pulse width relative to a duration between successive pulses). In other examples, the duty cycle of the light source 602 may be independent of the interrogation module 632, so that the trigger signal may be used to mark the start of light pulses. The pulses terminate according to a fixed duty cycle.

The interrogation module 632 receives the signal pulses from the output optical fiber 626. The interrogation module 632 performs time-division multiplexing (TDM) to associate each signal pulse with one of the plurality of sensors 616, 618, 620. The interrogation module 632 performs coarse wavelength-division multiplexing (CWDM) to separate the wavelength bands from one another within each signal pulse. The interrogation module 632 performs wavelength-division multiplexing (WDM) to determine the sensed physical property from each corresponding peak wavelength value for each signal pulse. In some cases, the interrogation module 632 determines the shift in peak wavelength away from the center wavelength of a respective data channel, for each of the four data channels. In some examples, the interrogation module 632 uses interference effects to convert a wavelength shift in the spectrum to a phase shift, and then detects the phase shift for each of the four data channels. In some examples, the interference effects occur in at least one Michelson interferometer in the interrogation module 632.

In discussions that follow, the channels are split apart and combined along an optical path by a coarse wavelength division multiplexer, or a CWDM. It is intended that a CWDM as described herein may have a resolution sufficient to separate the data channels from each other, which may have spectral widths on the order of 20 nm per channel, but may not have a resolution sufficient to determine a peak wavelength within a particular channel, which may require resolution on the order of 0.1 nm or less. The resolution of the peak wavelength is performed by a wavelength division multiplexer, or WDM. In general, a CWDM is a simpler element than a WDM. In some cases a CWDM may be a passive device having a wavelength-sensitive coating that can reflect one band of wavelengths while transmitting an adjacent band of wavelengths. For example, CWDM is used to separate the X channel, the Y channel, the Z channel, and the H channel from one another.

In many cases, if the desired quantity is acceleration, then several calculable intermediate quantities may be obtained between the sensing of the phase shift and the determination of an acceleration value. For instance, the wavelength shift may be obtained from the detected phase shift, although such a wavelength shift need not be explicitly determined by the interrogation module 632 or otherwise by processing assembly 634. Similarly, the detected phase shift may be converted to a separation between the reflective surfaces in a corresponding Fabry-Perot cavity to obtain an acceleration value, although such separation need not be explicitly determined by the processing assembly 634. In some cases, the processing assembly 634 may combine the information gathered from multiple sensors in order to determine a location and/or an intensity of a particular seismic event; in these cases, the acceleration itself may be an intermediate quantity that is used internally by the processing assembly 634 but is not presented to a user or otherwise output from the system. In cases where the desired quantity is not acceleration, but is another physical quantity such as pressure or velocity, there may also be intermediate quantities that need not be explicitly determined by the computing device 634 or presented to a user.

Four illustrative interrogation modules are discussed in the following "EXAMPLE" sections. Each example includes a different configuration of the elements that perform the TDM, CWDM, and WDM, as described above. All four examples are well-suited for use in the sensing system 600 shown in FIG. 6. In addition, all four examples are compatible with the light source 602, the splitters 612, 614, the sensors 616, 618, 620, and the combiners 622, 624, all of which are omitted from FIGS. 7-10 for simplicity. In the first two examples, phase generated carrier (PGC) is employed to modulate one of two arms of one or more interferometers. In the second two examples, the two arms of one or more interferometers include fixed phase shifts between the arms, which allow interference of the two arms without modulation of one of the arms.

The four examples are generally immune from polarization fading, which can result in variation of detected or demodulated optical information. When present, such fading can reduce a system signal-to-noise ratio or otherwise confound recovery of interferometrically-modulated optical signals carrying useful information because such information can be swamped by polarization variation at the detector or demodulator.

EXAMPLE 1

Figure 7:
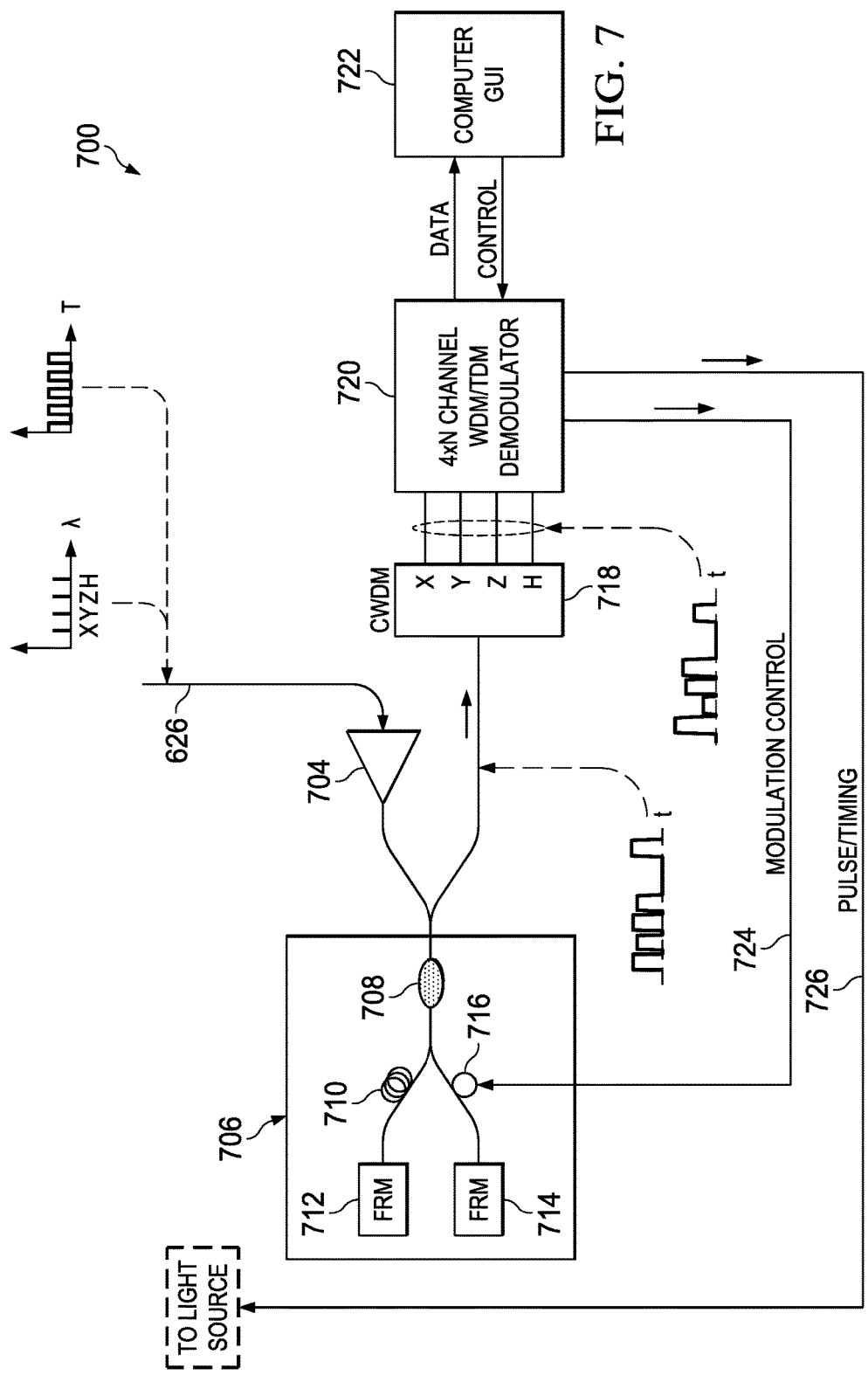
FIG. 7 is a schematic of an illustrative topology for a WDM/TDM demodulator as used in a sensing system.

FIG. 7 is a schematic drawing of a first illustrative interrogation module 700, which includes a single Michelson interferometer 706 that converts a wavelength shift to a phase shift, followed by a CWDM 718 to separate the four data channels from one another, followed by a 4-by-N channel WDM/TDM demodulator 720 that converts a phase shift to an intensity that is detectable on a detector, and also matches a sensed set of spectra with the proper sensor. In some embodiments, as in FIG. 1, the interrogation module and the light source may generally be considered part of the processing assembly 118.

In this illustrative interrogation module 700, the output fiber 626 delivers pulsed light having a spectrum that may be analyzed to extract data sensed from a corresponding sensor. The spectrum has four peaks, where the peak wavelength of each peak is indicative of a detected acceleration value. The pulses are delivered to an amplifier 704. An example of a suitable amplifier 704 is an EDFA. The output of the optical amplifier 704 has the same spectral content, showing four peaks, but with a higher amplitude for each peak.

The amplified pulses from the optical amplifier 704 then form the input to a Michelson interferometer (MCI) 706. In the Michelson interferometer, the input is split into two paths at a splitter/combiner 708. A first path in the Michelson interferometer includes a fixed delay coil 710 and terminates at a Faraday rotator mirror 712. Light traveling along the first path reflects at the Faraday rotator mirror 712, and returns along the first path through the fixed delay coil 710 to the splitter/combiner 708. The Faraday rotator mirror 712 rotates the plane of polarization by ninety degrees at the reflection. This ninety degree rotation of the plane of polarization can correct for random changes in birefringence that occur within the fiber, which might otherwise cause a deterioration in fringe contrast at the detector downstream. Other Faraday rotator mirrors in this example and in other examples function in the same manner.

A second path in the Michelson interferometer includes a piezoelectric transducer (PZT)-based modulator 716, which can vary the effective optical path length of the second path in a controllable manner. Light traveling along the second path reflects at the Faraday rotator mirror 714, and returns along the second path through the PZT-based modulator 716 to the splitter/combiner 708. The PZT-based modulator 716 is controlled by a periodic signal, typically sinusoidal in nature, so that the optical path length of the second path varies periodically, typically sinusoidally. The periodic signal is typically synchronized to the trigger signal that is fed to the light source. The depth of such a periodic signal is typically matched to the maximum phase shift that is to be detected in the interferometer, and the mathematical relationships that determine an optimal depth selection are well-known to those skilled in the art. Other PZT-based modulators in other examples function in the same manner, and are also synchronized to the trigger signal that is fed to the light source.

After the pulses from the first and second paths have reentered the splitter/combiner 708, the pulses interfere with each other. Such interference converts the wavelength information in the pulses into phase information. Mathematically, the phase Φ of the pulses, after interference, is given by $$\Phi = 2\frac{2\pi nL}{\lambda} \quad (1)$$

where n is the refractive index of the fiber used in the Michelson interferometer 706, L is the optical path difference between the two arms of the Michelson interferometer 706, and λ is the center wavelength of the CWDM channel. The number "2" is at the front of the right-hand side of the equation to indicate a round-trip optical path difference.

One can take partial derivatives of both sides of equation (1) to arrive at an expression for phase shift, ΔΦ, as a function of wavelength shift, Δλ:

$$\Delta\Phi = -\frac{4\pi nL}{\lambda^2}\Delta\lambda \quad (2)$$

where the wavelength shift, Δλ, is produced by the sensors, and may be formed as the difference between a transmitted wavelength and a center wavelength of the corresponding wavelength band. Alternatively, other suitable reference wavelengths, other than the center wavelength, may also be used in forming the wavelength shift.

After the pulses have interfered at the splitter/combiner 708, they are directed into a CWDM 718 that separates them by wavelength into four bands (for instance, the X, Y, Z, H bands). The four bands are directed along four separate fibers into a 4-by-N channel WDM/TDM demodulator 720. The demodulator 720 directs appropriate periodic electrical signals 724, 726 to the PZT-based modulator 716 and the light source, respectively. Data from the demodulator 720 is directed electronically to a processing unit 722 within a processing assembly, which can store the data, process the data, and/or present the processed data to a user through a GUI. The processing unit 722 can also control the demodulator 720.

One suitable demodulator 720 may be an off-the-shelf unit that has been modified for use with the sensing system, such as 600 in FIG. 6. For instance, a suitable, commercially available unit that can be modified is a model TDI-7000 TDM Fiber Interrogator, sold by OPTIPHASE® of Van Nuys, Calif. In many examples, it would be preferred to replace an internal high coherence light source that comes with the unit with the pulsed, high-powered, broadband light source 200 shown in FIG. 2. Further, it would be preferable to replace a source side internal compensator, which is designed for an optical path difference of over 40 meters, with a receiver side readout interferometer having an optical path difference of around 1 or 2 mm. An additional modification may include removing the polarization diversity receiver (PDR) with a tri-mask and instead using a single photo-receiver, as the PDR has a correction for polarization fading that is not needed for these example detection schemes and would otherwise create an unnecessary loss of optical power.

In the interrogation module 700 of FIG. 7, one arm of the Michelson interferometer is modulated by the PZT-based modulator 716. This PZT-based modulator 716 expands and contracts the optical path length of one arm of the interferometer periodically with a particular depth. In conventional interferometers, the periodic expansion and contraction has a particular depth optimized to a center wavelength of the light to be used in the interferometer. However, in the disclosed example system, the light in the interferometer spans four different wavelength bands, rather than a single wavelength band. The particular depth can only have a single value, which cannot simultaneously be optimal for all four wavelength bands. As a result, for many example systems, the particular depth will be chosen based on a wavelength approximately in the center of all four bands. There may be applications that would benefit from a greater accuracy, for which a relatively increased modulation depth would be desirable for each of the four data channels. Such an example interrogation module having this increased accuracy is discussed in Example 2.

EXAMPLE 2

Figure 8:
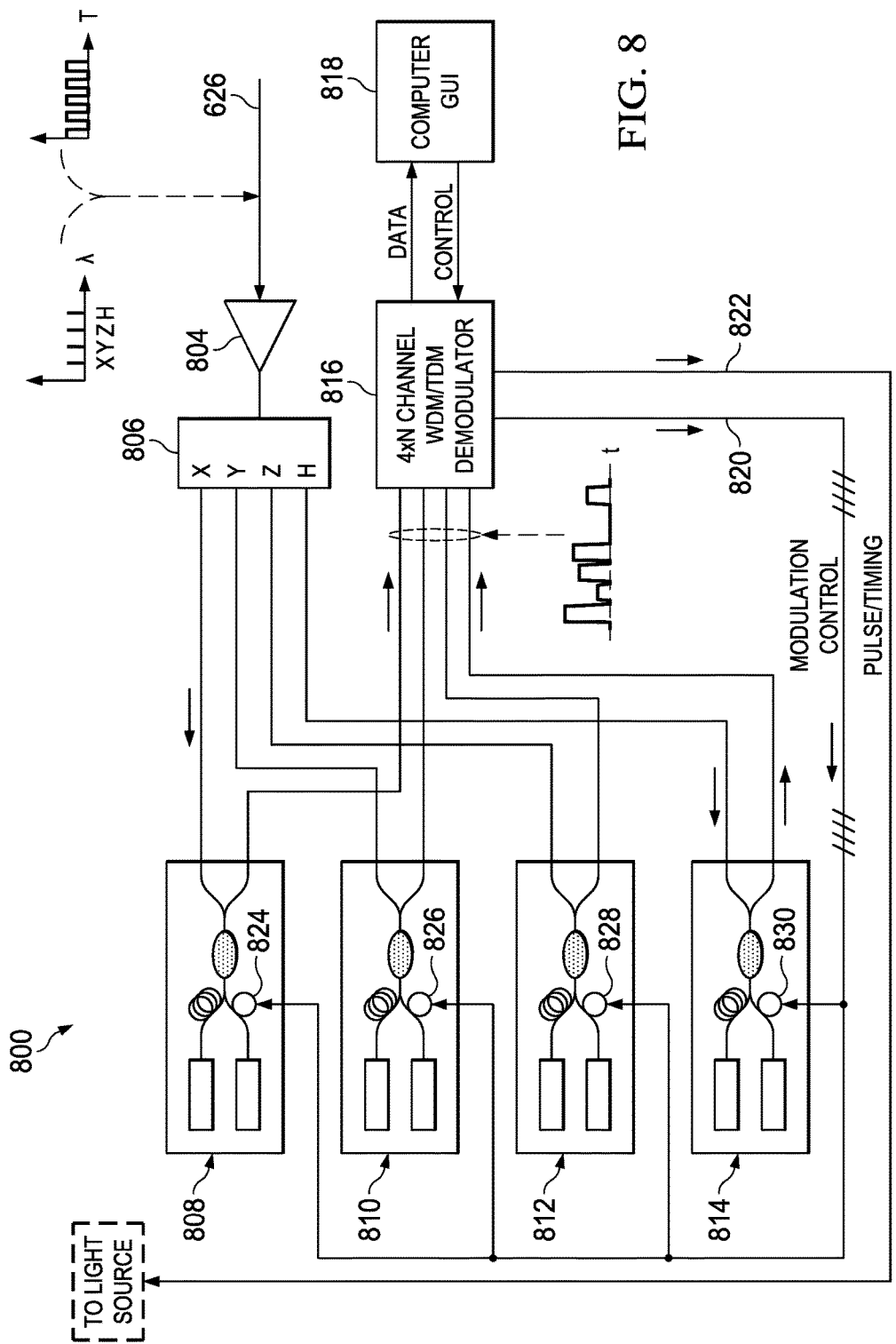
FIG. 8 is a schematic of another illustrative topology for a WDM/TDM demodulator as used in a sensing system.

FIG. 8 is a schematic drawing of a second example interrogation module 800, which includes a CWDM 806 to separate the four data channels from one another, followed by four Michelson interferometers 808, 810, 812, 814 that each converts a wavelength shift to a phase shift, followed by a 4-by-N channel WDM/TDM demodulator 816 that converts a phase shift to an intensity that is detectable on a detector and also matches a sensed set of spectra with the proper sensor.

In this example interrogation module 800, the output fiber 626 delivers pulsed light to an amplifier 804. The amplified pulses from the optical amplifier 804 pass through a CWDM 806, which separates them into the four data channels X, Y, Z, H. Light in each of the four data channels is directed to its own Michelson interferometer 808, 810, 812, 814. Each Michelson includes first and second paths, as described above, with the second path in each including a PZT-base modulator 824, 826, 828, 830. These four modulators may all have their modulation depths optimized for the individual data channels, which was not possible with Example 1. Outputs from the four Michelson interferometers 808, 810, 812, 814 are directed along four separate fibers into a 4-by-N channel WDM/TDM demodulator 816, which communicates with a processing unit 818 (such as may, in some embodiments, form a part of a processing assembly), and drives the trigger signal 822 delivered to the light source and the modulation signals 820 delivered to the four PZT-based modulators 824, 826, 828, 830 in the four Michelson interferometers 808, 810, 812, 814.

Compared with Example 1, the example interrogation module 800 may be more accurate, because a modulation depth may be optimized for each of the four data channels, instead of a single modulation depth serving the four different data channels. In addition, the example interrogation module 800 may also be more expensive than Example 1, due to the three extra Michelson interferometers.

A further alternative configuration is discussed in Example 3, which generally allows for a higher bandwidth, reduced cost, and additional simplicity over Example 1 because the PZT-based modulator of Example 1 may be omitted.

EXAMPLE 3

Figure 9:
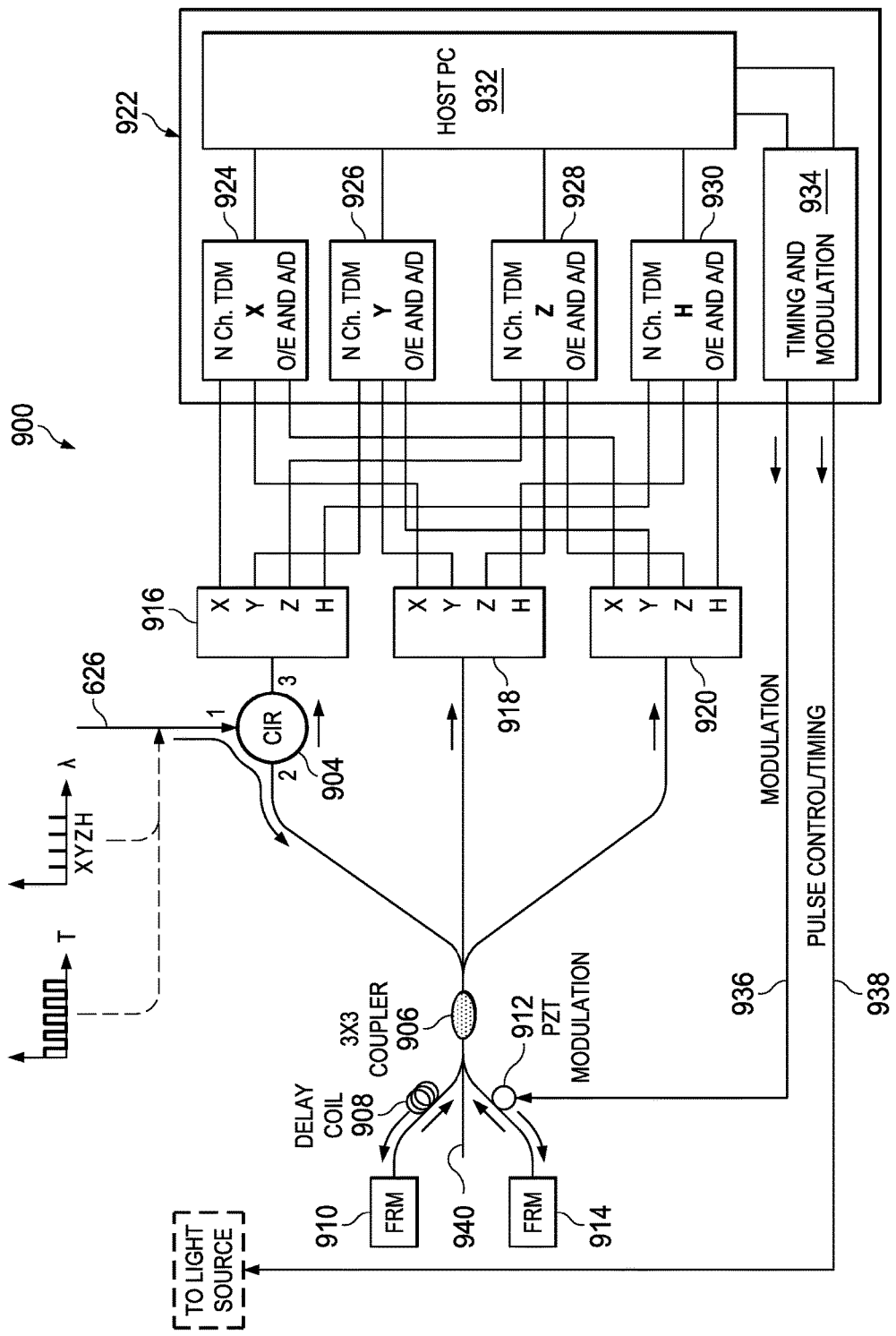
FIG. 9 is a schematic of another illustrative topology for a WDM/TDM demodulator as used in a sensing system.

FIG. 9 is a schematic drawing of a third example interrogation module 900, which includes a 3-by-3 coupler 906 that couples light into and out of a Michelson interferometer that converts a wavelength shift to a phase shift, the 3-by-3 having three outputs, each of which is directed into a respective CWDM 916, 918, 920 that separates the four data channels from one another, followed by four 1-by-N channel WDM/TDM demodulators 924, 926, 928, 930 that convert a phase shift to an intensity that is detectable on a detector, and also match a sensed set of spectra with the proper sensor. Note that the four 1-by-N WDM/TDM demodulators are functionally equivalent to the single 4-by-N WDM/TDM demodulator discussed above.

In this example interrogation module 900, the output fiber 626 delivers pulsed light to a first port of a circulator 904. The pulses exit through a second port of the circulator 904 and are directed toward one of three input ports in a 3-by-3 coupler 906. The pulses are then split between two of the three output ports of the 3-by-3-coupler 906, where the two output ports are configured similar to the two arms of a Michelson interferometer.

A first of the three output ports directs light to a fixed delay coil 908 and terminates at a Faraday rotator mirror 910. Light traveling from this first output port reflects at the Faraday rotator mirror 910, and returns through the fixed delay coil 908 to the 3-by-3 coupler 906. A second of the three output ports directs light through an optional PZT-based modulator 912 and terminates at a Faraday rotator mirror 914. Light traveling from this second output port reflects at the Faraday rotator mirror 914, and returns through the optional PZT-based modulator 912 to the 3-by-3-coupler 906. A portion of the pulses are also directed along a third port 940 of the three output ports, but these pulses do not contribute to the signals in the device. This unused third port is omitted from the drawings of 3-by-3 couplers in upcoming FIG. 10, discussed below.

Light reflecting from the two FRM's in the Michelson interferometer interferes, but the configuration of the optical elements differs slightly from that of the Michelson interferometer discussed above. Whereas the Michelson interferometer of FIG. 7 uses a splitter/combiner (2×2 directional coupler) 708, the configuration of FIG. 9 instead uses a 3-by-3-coupler 906. For this 3-by-3-coupler-based Michelson interferometer, the three outputs from the interferometer have a 120-degree phase difference from one another. In the absence of modulation to generate phase generated carrier (PGC) or precise control of the modulation depth, for example, demodulation of the optical phase difference between the two arms is possible with a relatively simple calculation using the three outputs. The PZT-based modulator 912 is not used for phase demodulation, and is included in this example optionally as a way to optionally inject a reference signal, if desired.

The pulses returning to the two output ports of the 3-by-3 coupler 906 interfere with each other, and are split among the three input ports. One of the three input ports directs the pulses to the second port of the circulator 904. The pulses leave the third port of the circulator 904 and enter a first CWDM 916. Pulses from the second and third of the three input ports enter respective CWDMs 918, 920.

Each CWDM 916, 918, 920 has four outputs, with each of the four outputs being directed to one of four N channel TDM demodulators 924, 926, 928, 930. The four demodulators 924, 926, 928, 930 correspond to the X, Y, Z, and H channels.

The outputs from the N channel TDM demodulators 924, 926, 928, 930 are directed to a processing assembly 932, which is in communication with pulse control and timing modulator 934. The pulse control and timing modulator 934 directs a trigger signal 938 to the light source and sends an (optional) periodic signal 936 to the PZT-based modulator 912. In some cases, the demodulators 924, 926, 928, 930, device processing unit 932, and the timing modulator 934 are all a portion of a processing assembly 922, as discussed earlier herein.

The 3-by-3-coupler-based demodulation of Example 3 is not necessarily as accurate as the PGC-based demodulation scheme of Examples 1 and 2. However, Example 3 is generally simpler and is believed to be capable of a higher signal bandwidth than the PGC scheme. The system of Example 3 generally includes one Michelson interferometer with three CWDM's. Another configuration would be using one CWDM with four Michelson interferometers, such as described in detail below in Example 4.

Example 4 is not necessarily provided for performance enhancement versus Example 3, but Example 4 may provide convenience in terms of component availability or cost.

EXAMPLE 4

Figure 10:
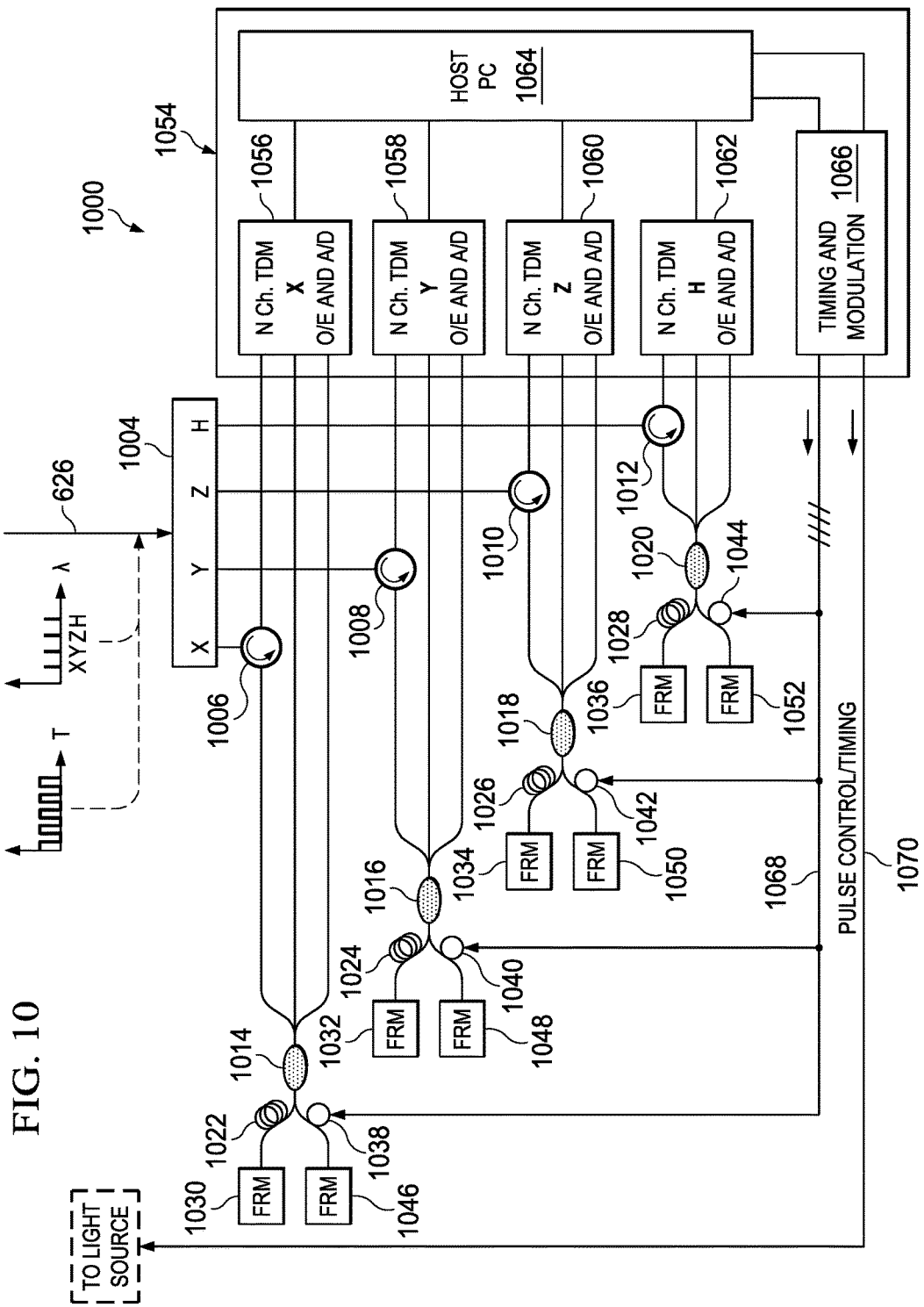
FIG. 10 is a schematic of another illustrative topology for a WDM/TDM demodulator as used in a sensing system.

FIG. 10 is a schematic drawing of a fourth example interrogation module 1000, which includes a CWDM 1004 to separate the four data channels from one another, followed by four interferometers coupled with respective 3-by-3 couplers 1014, 1016, 1018, 1020, followed by four 1-by-N channel WDM/TDM demodulators 1056, 1058, 1060, 1062 that converts a phase shift to an intensity that is detectable on a detector, and also matches a sensed set of spectra with the proper sensor. Note that only two of the three outputs are shown on the left-hand sides of the 3-by-3 couplers 1014, 1016, 1018, 1020; these third outputs are unused, similar to element 940 in FIG. 9, and are therefore omitted from FIG. 10 for clarity.

In this example interrogation module 1000, the output fiber 626 delivers pulsed light to a CWDM 1004, which separates the light into the four data channels X, Y, Z, H. Light in each of the four data channels is directed through a respective circulator 1006, 1008, 1010, 1012 to a respective 3-by-3 coupler 1014, 1016, 1018, 1020. Each 3-by-3 coupler 1014, 1016, 1018, 1020 has a first output, which includes a fixed delay coil 1022, 1024, 1026, 1028 and a Faraday rotator mirror 1030, 1032, 1034, 1036 and has a second output, which includes a PZT-based modulators 1038, 1040, 1042, 1044 and a Faraday rotator mirror 1046, 1048, 1050, 1052. Light traversing the first output interferes with light traversing the second output, and the interfered light is directed into four 1-by-N demodulators 1056, 1058, 1060, 1062. The demodulators 1056, 1058, 1060, 1062 communicate with a processing unit 1064, which in turn communicates with a timing module 1066, which in turn drives the trigger signal 1070 delivered to the light source and the optional modulation signals 1068 delivered to the four PZT-based modulators 1038, 1040, 1042, 1044. In this example, the demodulators 1038, 1040, 1042, 1044, processing unit 1064, and timing module 1066 are all part of a processing assembly, as indicated generally at 1054. As discussed above, without being bound by theory, Examples 3 and 4 are believed to have relatively similar performance.

Illustrative Methods of Operation

Figure 11:
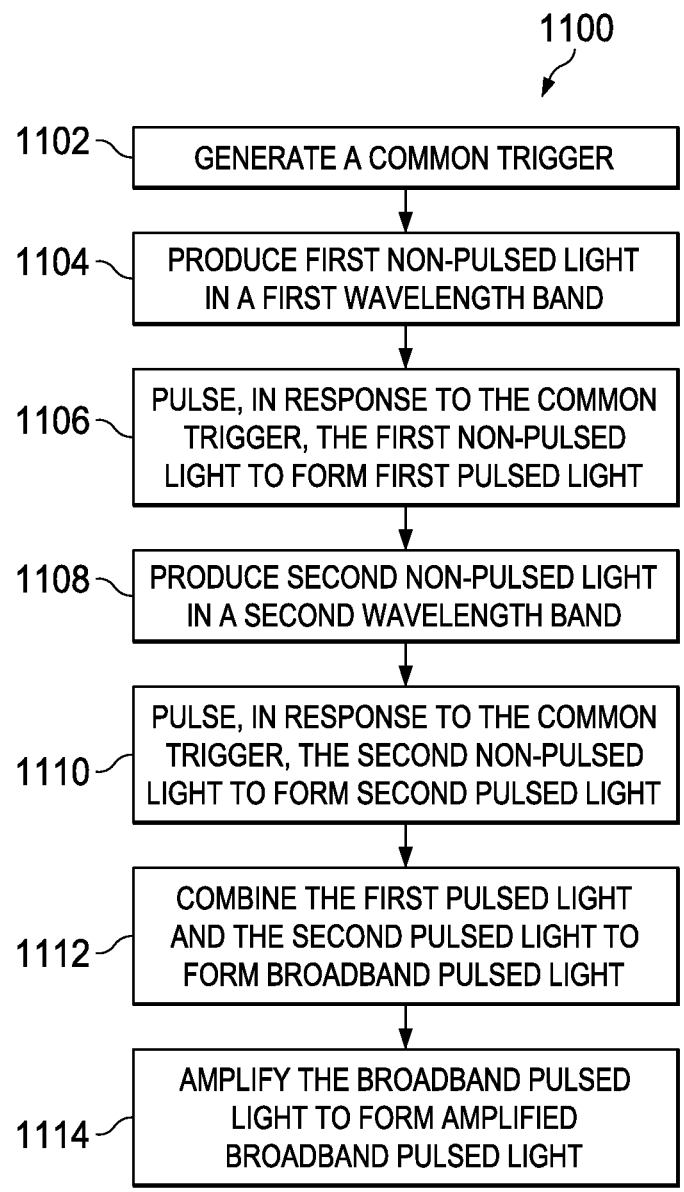
FIG. 11 is a flow chart for a method of operation for the light source.

FIG. 11 is a flow chart of an example method 1100 that can produce pulsed light. The example method 1100 begins at 1102 with generation of a common trigger for the light source. The common trigger will commonly, though not necessarily, be a periodic signal (such as 214, in FIG. 2). A suitable trigger may be the periodic trigger signal 604 provided from the interrogation module 632 to the light source 602 in FIG. 6.

Step 1104 produces first non-pulsed light, such as 206, in a first wavelength band. Step 1106 pulses, in response to the common trigger, the first non-pulsed light to form first pulsed light, such as 216, in the first wavelength band. Similarly, step 1108 produces second non-pulsed light, such as 208, in a second wavelength band. The second wavelength band is different from the first wavelength band. Step 1110 pulses, in response to the common trigger, the second non-pulsed light to form second pulsed light, 218, in the second wavelength band. In some examples, the pulsing in steps 1106 and 1110 is performed by separate amplifiers, such as amplifiers 206, 208 in FIG. 2, which are triggered from the same common trigger signal 214. The first pulsed light and the second pulsed light are, in many examples, pulsed synchronously, due to the common trigger.

Step 1112 combines the first pulsed light, such as 216, and the second pulsed light, such as 218, to form broadband pulsed light, such as 226, at a wavelength band that includes both the first wavelength band and the second wavelength band. The broadband pulsed light is also pulsed synchronously with the common trigger. Step 1114 amplifies the broadband pulsed light, such as 226, to form amplified broadband pulsed light, such as 230. The amplified broadband pulsed light also has a wavelength band that includes both the first wavelength band and the second wavelength band. The amplified broadband pulsed light is also pulsed synchronously with the common trigger.

Figure 12:
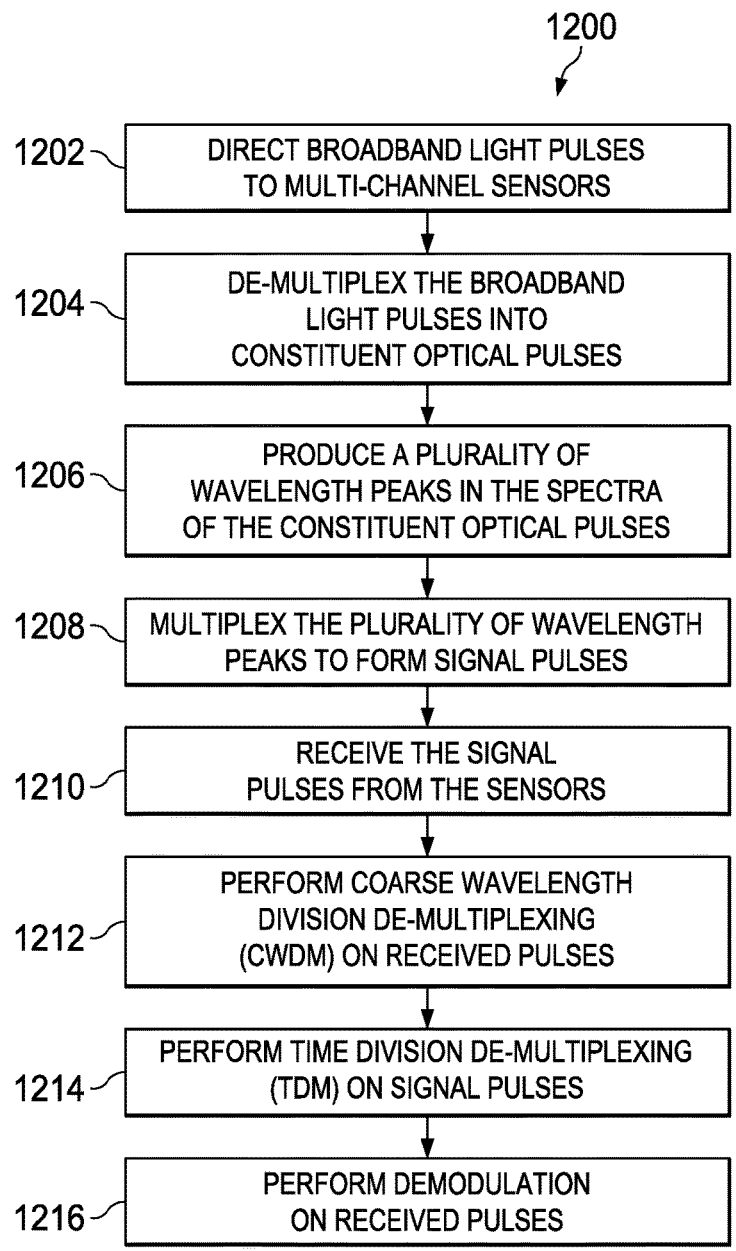
FIG. 12 is a flow chart for a method of operation for the sensing system.

FIG. 12 is a flow chart of an example method of operation 1200 for the sensing system described above. The method 1200 begins at 1202 by directing broadband pulses to a plurality of multi-channel sensors. In some examples, the sensors have four channels dedicated to particular physical properties, such as accelerations in the X, Y, and Z directions, plus non-directional sensing of acoustic vibrations H. In other examples, the sensors have three channels dedicated to physical properties, such as accelerations, in the X, Y, and Z directions, and the acoustic vibrations channel is omitted. In other examples, other physical properties may be measured, such as velocities in the X, Y, and Z directions.

At step 1204, the method 1200 comprises de-multiplexing the broadband light pulses (i.e., optical signals) into constituent optical signals. As explained above, this is preferably accomplished using a coarse wavelength division demultiplexer, although any suitable demultiplexing technology may be used. At step 1206, the method comprises producing a plurality of wavelength peaks in the wavelength bands of the constituent optical pulses. Each wavelength peak falls within a wavelength band corresponding to a different constituent optical pulse (i.e., a different channel). At step 1208, the method comprises multiplexing the plurality of wavelength peaks to form signal pulses. This is preferably accomplished using a coarse wavelength division multiplexer, although any suitable multiplexing technology may be used.

At step 1210, the method comprises an interrogation module and/or processing logic receiving the signal pulses from the sensors. At step 1212, coarse wavelength division demultiplexing—or any other suitable demultiplexing—is performed on the received signal pulses to separate the signals from the different channels within each sensor. At step 1214, time division demultiplexing is performed on the signal pulses to associate a set of measurements with a corresponding sensor. At step 1216, optical phase demodulation is performed to determine the sensed physical property from each corresponding peak wavelength value for each signal pulse using, for instance, a PGC demodulation scheme or a 3-by-3-coupler based demodulation scheme.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A system comprising:
   a source of broadband light;
   an input optical fiber coupled to the source of broadband light to receive the broadband light;
   a wavelength division demultiplexer coupled to the input optical fiber, the wavelength division demultiplexer to demultiplex the broadband light into constituent optical signals;
   a plurality of detectors arranged in parallel and coupled to the demultiplexer, wherein each of the plurality of detectors is to modify a different one of the constituent optical signals to produce an output optical signal having a characteristic that varies in response to at least one subterranean physical property affecting that detector;
   a wavelength division multiplexer coupled to the plurality of detectors to multiplex output optical signals received from the plurality of detectors; and
   an output optical fiber coupled to the multiplexer to receive the multiplexed output optical signals.

2. The system of claim 1, wherein each of the plurality of detectors produces the output optical signal that indicates a different directional component of a subterranean physical property.

3. The system of claim 1, wherein each of the detectors comprises broadband wavelength spectrum reflectors.

4. The system of claim 1, wherein each of the plurality of detectors couples to the demultiplexer, and wherein each of the plurality of detectors couples to the multiplexer.

5. The system of claim 1, wherein the broadband light extends at least partially across a telecommunications C-band and a telecommunications L-band.

6. The system of claim 1, further comprising an interrogation module coupled to the output optical fiber, the interrogation module comprising:
   another demultiplexer coupled to the output optical fiber and configured to separate the output optical signals from different ones of the detectors; and
   a converter to convert the separated output optical signals to electrical output signals.

7. The system of claim 1, wherein each of the plurality of detectors comprises a Fabry-Perot cavity.

8. A system, comprising:
   a wavelength division demultiplexer to demultiplex a broadband optical signal into constituent optical signals;
   a plurality of detectors arranged in parallel and coupled to the demultiplexer, wherein each of the plurality of detectors modifies a different one of the constituent optical signals to produce an output optical signal having a characteristic that varies in response to a physical property affecting that detector; and
   a wavelength division multiplexer to multiplex output optical signals received from the plurality of detectors;
   wherein each of the plurality of detectors couples to both the demultiplexer and to the multiplexer.

9. The system of claim 8, wherein each of the plurality of detectors couples to the demultiplexer without any of the remaining plurality of detectors being disposed between the demultiplexer and that detector, and wherein each of the plurality of detectors couples to the multiplexer without any of the remaining plurality of detectors being disposed between the multiplexer and that detector.

10. The system of claim 8, wherein the physical property is selected from the group consisting of acceleration and acoustic vibration.

11. The system of claim 8, wherein the characteristic comprises either a wavelength or a wavelength range.

12. The system of claim 8, wherein the broadband optical signal has a wavelength range that encompasses wavelength ranges of the constituent optical signals, and wherein the wavelength ranges of the constituent optical signals encompass each wavelength associated with the output optical signals.

13. The system of claim 8, wherein each of the plurality of detectors comprises a Fabry-Perot cavity having broadband wavelength reflector.

14. The system of claim 8, wherein the demultiplexer comprises a coarse wavelength division demultiplexer and wherein the multiplexer comprises a coarse wavelength division multiplexer.

15. A method for sensing subterranean physical properties, comprising:
   providing a broadband optical signal having a first wavelength range;
   demultiplexing the broadband optical signal into constituent optical signals according to wavelength, each of the constituent optical signals having a wavelength range narrower than the first wavelength range;
   producing output optical signals using the constituent optical signals and one or more subterranean physical properties, each of the output optical signals associated with one or more wavelengths that fall within a corresponding constituent optical signal wavelength range; and
   multiplexing the output optical signals according to wavelength to produce a signal pulse.

16. The method of claim 15, wherein said subterranean physical properties comprise acceleration.

17. The method of claim 15, wherein said one or more wavelengths associated with each of the output optical signals vary according to the one or more subterranean physical properties.

18. The method of claim 15, wherein said producing comprises using multiple Fabry-Perot cavities, each of said cavities associated with a different directional component of the one or more subterranean physical properties.

19. The method of claim 18, wherein using multiple Fabry-Perot cavities comprises using broadband wavelength reflector.

20. The method of claim 18, wherein using multiple Fabry-Perot cavities comprises using Fabry-Perot cavities all of which couple to a demultiplexer that performs said demultiplexing and to a multiplexer that performs said multiplexing.

* * * * *